United States Patent
Gonzales et al.

(10) Patent No.: US 9,957,468 B2
(45) Date of Patent: *May 1, 2018

(54) SHAPED PARTICLES

(71) Applicant: The Procter & Gamble Company, Cincinnati, OH (US)

(72) Inventors: Denis Alfred Gonzales, Brussels (BE); Michael Leslie Groombridge, Prudhoe (GB); Michael McDonnell, Blyth (GB)

(73) Assignee: The Procter & Gamble Company, Cincinnati, OH (US)

( * ) Notice: Subject to any disclaimer, the term of this patent is extended or adjusted under 35 U.S.C. 154(b) by 206 days.

This patent is subject to a terminal disclaimer.

(21) Appl. No.: 14/934,498

(22) Filed: Nov. 6, 2015

(65) Prior Publication Data

US 2017/0130166 A1  May 11, 2017

(51) Int. Cl.
| | | |
|---|---|---|
| *C11D 3/14* | (2006.01) | |
| *C11D 17/06* | (2006.01) | |
| *B24D 3/00* | (2006.01) | |
| *C09K 3/14* | (2006.01) | |

(52) U.S. Cl.
CPC ............... *C11D 3/14* (2013.01); *B24D 3/00* (2013.01); *C09K 3/1409* (2013.01); *C11D 17/06* (2013.01)

(58) Field of Classification Search
CPC ............................................ C11D 3/14
See application file for complete search history.

(56) References Cited

U.S. PATENT DOCUMENTS

| | | | |
|---|---|---|---|
| 2,468,853 | A | 5/1949 | Williamson |
| 2,740,725 | A | 4/1956 | Ball |
| 4,548,617 | A | 10/1985 | Miyatani et al. |
| 6,268,325 | B1 | 7/2001 | Luciani et al. |
| 7,307,055 | B2 | 12/2007 | Cook et al. |
| 7,799,968 | B2 | 9/2010 | Chen et al. |
| 8,470,759 | B2 | 6/2013 | Gonzales et al. |
| 9,540,594 | B2 | 1/2017 | Gonzales et al. |
| 9,567,505 | B2 | 2/2017 | Yener et al. |
| 2002/0173243 | A1 | 11/2002 | Costas et al. |
| 2003/0211802 | A1 | 11/2003 | Keck et al. |
| 2005/0136772 | A1 | 6/2005 | Chen et al. |
| 2007/0043147 | A1 | 2/2007 | Higgins et al. |
| 2007/0130713 | A1 | 6/2007 | Chen et al. |
| 2011/0034615 | A1 | 2/2011 | Ishii et al. |
| 2011/0150788 | A1 | 6/2011 | Gonzales et al. |
| 2011/0150949 | A1* | 6/2011 | Gonzales ............. C11D 3/3749 424/401 |
| 2011/0262371 | A1* | 10/2011 | Deleersnyder ....... C11D 3/3726 424/49 |
| 2011/0262504 | A1* | 10/2011 | Deleersnyder ....... A61K 8/0208 424/401 |
| 2012/0321567 | A1* | 12/2012 | Gonzales ............. A61K 8/87 424/49 |
| 2013/0022556 | A1* | 1/2013 | Gonzales ............. A61Q 19/00 424/54 |
| 2013/0039961 | A1* | 2/2013 | Gonzales ............. A61K 8/8117 424/401 |
| 2013/0072417 | A1* | 3/2013 | Perez-Prat Vinuesa ............. C11D 17/0013 510/236 |
| 2013/0180180 | A1 | 7/2013 | Yener |
| 2014/0194565 | A1 | 7/2014 | Harada |
| 2017/0130166 | A1* | 5/2017 | Gonzales ............. C11D 3/14 |

FOREIGN PATENT DOCUMENTS

| | | |
|---|---|---|
| JP | 04-331294 A | 11/1992 |
| JP | 10025239 A | 1/1998 |
| WO | WO 2008 109270 A1 | 9/2008 |

OTHER PUBLICATIONS

International Search Report and Written Opinion dated Jan. 6, 2017, U.S. Appl. No. 14/934,498, 17 pgs.
International Search Report and Written Opinion dated Jan. 17, 2017, U.S. Appl. No. 14/934,512, 11 pgs.
International Search Report and Written Opinion dated Jan. 19, 2017, U.S. Appl. No. 14/934,516, 9 pgs.
International Search Report and Written Opinion dated Jan. 9, 2017, U.S. Appl. No. 14/934,529, 10 pgs.
U.S. Appl. No. 14/934,512, filed Nov. 6, 2015, Denis Alfred Gonzales et al.
U.S. Appl. No. 14/934,516, filed Nov. 6, 2015, Denis Alfred Gonzales et al.
U.S. Appl. No. 14/934,529, filed Nov. 6, 2015, Denis Alfred Gonzales et al.
U.S. Appl. No. 14/934,512, filing date Nov. 6, 2015, Denis Alfred Gonzales et al.
U.S. Appl. No. 14/934,516, filing date Nov. 6, 2015, Denis Alfred Gonzales et al.
U.S. Appl. No. 14/934,529, filing date Nov. 6, 2015, Denis Alfred Gonzales et al.

* cited by examiner

*Primary Examiner* — Nicole M Buie-Hatcher
*Assistant Examiner* — M. Reza Asdjodi
(74) *Attorney, Agent, or Firm* — David K Mattheis

(57) ABSTRACT

Shaped particles having a longitudinal length (L) and a predetermined complex cross-sectional shape extending on a plane perpendicular to said longitudinal length (L). The cross-sectional shape has at least one vertex. An edge extends along the length L from the vertex. The particles further comprise an anchoring element disposed away from the edge. The ratio of said length (L) to a perimeter-equivalent diameter of said predetermined cross-sectional shape "ECD $P_{Hull}$" is between about 0.5 and about 5.

13 Claims, 2 Drawing Sheets

SHAPED PARTICLES

FIELD OF THE INVENTION

The invention relates to shaped particles. The invention relates particularly shaped particles for inclusion in fibrous structures adapted as cleaning elements.

BACKGROUND OF THE INVENTION

Articles containing abrasive components such as particles are known in the art. Such articles may be used for cleaning a variety of surfaces; especially those surfaces that tend to become soiled with difficulty to remove stains and soils.

Such articles may comprise a substrate and a plurality of abrasive particles where the abrasive particles are disposed either on the surface of the substrate or within the substrate such that the abrasive particles at least partially protrude from at least one surface and the substrate during use. Examples of substrates that might include such abrasive particles include nonwoven articles including disposable wipes, paper towel, floor wipes, home care napkins, beauty care napkins, and baby wipes. Examples of abrasive particles include inorganic particles such as carbonate salt, clay, silica, silicate, shale ash, perlite and/or organic particles such as polymeric beads comprised of polypropylene, PVC, melamine, urea, polyacrylate and derivatives.

When used as a component of a nonwoven article, many commonly known abrasive particles may not be fully satisfactory. The abrasive particles may separate from the rest of the article, in particular while scouring is exercised with the article. This may lead to inefficient cleaning and to unacceptable deposition of particles on the surface to be cleaned. Separately, the abrasive particles may move or "roll" while scouring, relative to the substrate, again leading to a loss of their abrasive cleaning efficiency.

The inventors have discovered that this could be alleviated by the use of particles having specific shape. This shape may be expressed as the "Solidity" of the particles. Selecting particles of the specified solidity may lead to both improvements in extent to which the particles are retained by the substrate, and improvements in cleaning by preventing "rolling" of the particles and maintaining the orientation of the particles, relative to the substrate and therefore relative to the surface being cleaned, during scouring.

Also, maintaining the orientation of the particles relative to the substrate may generate less damage to the surface to be cleaned.

The performance of the abrasive particles improves when the particles are bound to the substrate. When the particles are not physically immobilized on or in the substrate, the performance may decrease and the abrasive particles may fall off the sheet before or during use, creating an undesirable residue on the target surface and the hands of the user. When glues are used to bind the particles, the glue often covers a significant fraction of the particles, hindering its effectiveness and scrubbing performance. When the amount of glue is minimized, the adhesion of particles on the substrate may be ineffective, especially upon usage. Therefore it is highly desirable to provide a particle with a shape engineered to deliver both good scrubbing and self adhesion on the substrate, via mechanical anchoring.

SUMMARY OF THE INVENTION

In one aspect, shaped particles having a longitudinal length (L) and a predetermined complex cross-sectional shape extending on a plane perpendicular to said longitudinal length (L). The cross-sectional shape has at least one vertex. An edge extends along the length L from the vertex. The particles further comprise an anchoring element disposed away from the edge. The ratio of said length (L) to a perimeter-equivalent diameter of said predetermined cross-sectional shape "ECD $P_{Hull}$" is between about 0.5 and about 5

DETAILED DESCRIPTION OF THE INVENTION

Figure 1:
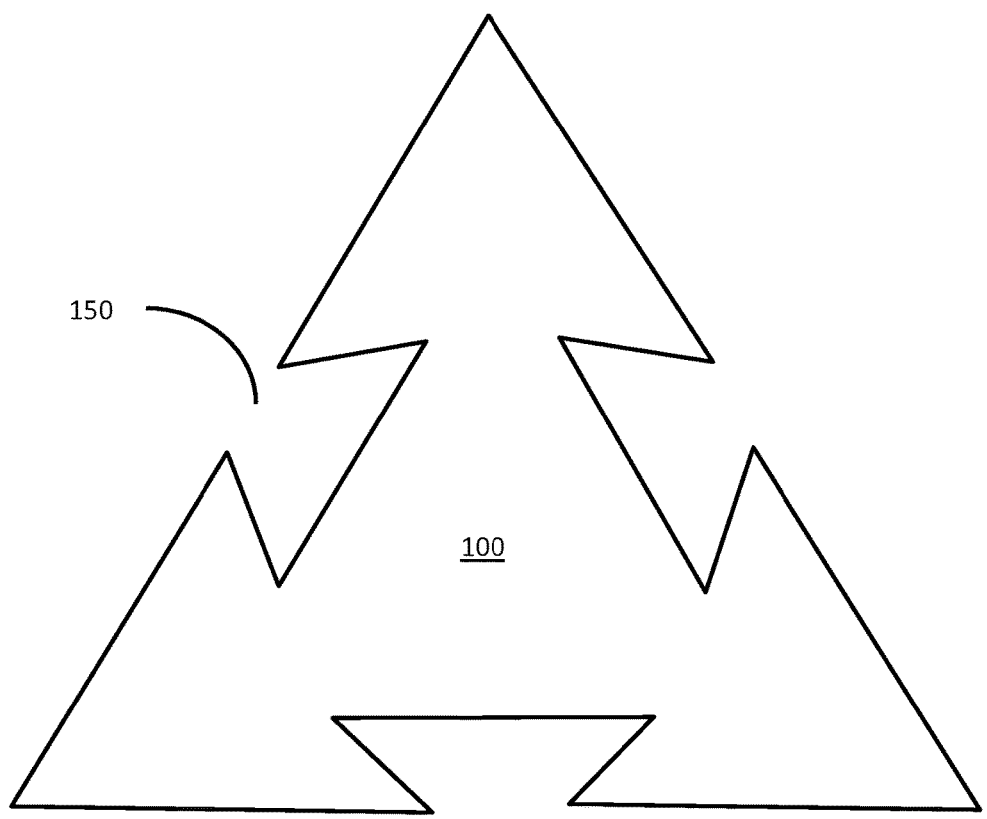
FIG. 1 provides a schematic cross-sectional view of a particle according to one embodiment of the invention.

All percentages, ratios and proportions used herein are by weight percent unless otherwise specified.

As used herein, the mean Equivalent Circle Diameter (ECD) is measured according to ASTM F1877-05 Section 11.3.2 or similar to the area-equivalent diameter (ISO 9276-6:2008(E) section 7). The mean ECD of particle population is calculated as the volume-weighted average of respective ECD of a particle population of at least 1000 particles, or at least 10,000 particles, or above 50,000 particles, or above 100,000 particles after excluding from the measurement and calculation the data of particles having area-equivalent diameter (ECD) of below 10 micrometers.

As used herein, the term Feret Diameter is defined as the distance between two parallel tangents of the projection of the particle at an arbitrary angle.

As used herein, Form factor is a mesoshape descriptor and is a quantitative, 2-dimension image analysis shape description and is being measured according to ISO 9276-6:2008 (E) section 8.2. Form factor is sometimes described in literature as being the difference between a particle's shape and a perfect sphere. Form factor values range from 0 to 1, where a form factor of 1 describes a perfectly spherical particle or disc-shaped particle as measured in a two dimensional projected image.

$$\text{Form Factor} = \frac{4\pi A}{P^2}$$

where A is projection area, which is 2D descriptor and P is the length of the perimeter of the particle. The applicants refer herein to Form factor as being volume-weighted mean Form Factor extracted from a distribution of particle measurements. As used herein, the MOHS hardness scale refers to an internationally recognized scale for measuring the hardness of a compound versus a compound of known hardness, see Encyclopedia of Chemical Technology, Kirk-Othmer, 4 th Edition Vol 1, page 18 or Lide, D. R (ed) CRC Handbook of Chemistry and Physics, 73 rd edition, Boca Raton, Fla.: The Rubber Company, 1992-1993. Many MOHS Test kits are commercially available containing material with known MOHS hardness. For measurement and selection of abrasive material with selected MOHS hardness, it is recommended to execute the MOHS hardness measurement with un-shaped particles e.g.: with spherical or granular forms of the abrasive material since MOHS measurement of shaped particles will provide erroneous results.

As used herein, the Shore® D hardness of the materials may be determined according to ASTM D2240-05 (2010). Shore® D hardness measurement may be carried out by using an ASTM durometer, such as the Type D Style Durometer available from Pacific Transducer Corp. of Los Angeles, Calif., or from ELECTROMATIC Equipment Co., Inc. 600 Oakland Ave Cedarhurst, N.Y. 11516.

As used herein, Solidity is a quantitative, 2-dimensional image analysis shape description, and is being measured according to ISO 9276-6:2008(E) section 8.2 as implemented via the Occhio Nano 500 Particle Characterisation Instrument with its accompanying software Callistro version 25 (Occhio s.a. Liege, Belgium). While particle shape can be defined in 3-dimension with dedicated analytical technique, the applicant has found, that the characterization of the particles shape in 2-dimension is most relevant and correlates with the abrasive performance of the cleaning particles. During the particle shape analysis protocol, the particles are orientated toward the surface—via gravity deposition—similarly to the expected particle orientation during the cleaning process. Hence, the object of the present invention regards the characterization of 2-D shape of a particle/particle population as defined by the projection of its shape on the surface on which the particle/particle population is deposited.

In one embodiment, the non-spherical particle herein has at least one edge or surface having a concave curvature. Solidity is a mesoshape parameter, which describes the overall concavity of a particle or particle population. Solidity values range from 0 to 1, where a solidity number of 1 describes a non-concave particle, as measured in literature as being:

$$Solidity = A/Ac$$

Where A is the projected area of the particle and Ac is the area of the convex hull (envelope) bounding the projection of the particle. The applicants refer herein to solidity as being volume-weighted mean solidity extracted from a distribution of particle measurements.

As used herein, the terms "mean solidity", or "mean Form factor", mean the volume-weighted average of the solidity, or Form Factor values from a population of at least 1000 particles, or at least 10,000 particles, or above 50,000 particles, or above 100,000 particles, after excluding from the measurement and calculation, the solidity or form factor data of particles having area-equivalent diameter (ECD) of below 10 micrometers.

As used herein, the Vickers hardness HV is measured at 23° C. according to standard methods ISO 14577-1, ISO 14577-2, ISO 14577-3. The Vickers hardness is measured from a solid block of the raw material at least 2 mm in thickness. The Vickers hardness micro indentation measurement is carried out by using the Micro-Hardness Tester (MHT), manufactured by CSM Instruments SA, Peseux, Switzerland. As per the ISO 14577 instructions, the test surface should be flat and smooth, having a roughness (Ra) value less than 5% of the maximum indenter penetration depth. For a 200 micrometer maximum depth this equates to a Ra value less than 10 micrometer. As per ISO 14577, such a surface may be prepared by any suitable means, which may include cutting the block of test material with a new sharp microtome or scalpel blade, grinding, polishing or by casting melted material onto a flat, smooth casting form and allowing it to thoroughly solidify prior testing.

Suitable general settings for the Micro-Hardness Tester (MHT) are as follows:
Control mode: Displacement, Continuous
Maximum displacement: 200 μm Approach speed: 20 nm/s
Zero point determination: at contact
Hold period to measure thermal drift at contact: 60 s
Force application time: 30 s
Frequency of data logging: at least every second
Hold time at maximum force: 30 s
Force removal time: 30 s
Shape/Material of intender tip: Vickers Pyramid Shape/Diamond Tip As used herein, the term nonwoven means: a manufactured sheet, web or batt of directionally or randomly orientated fibers, bonded by friction, and/or cohesion and/or adhesion, excluding paper and products which are woven, knitted, tufted, stitch-bonded incorporating binding yarns or filaments, or felted by wet-milling, whether or not additionally needled. The fibers may be of natural or man-made origin and may be staple or continuous filaments or be formed in situ. Commercially available fibers have diameters ranging from less than 0.001 mm to more than 0 2 mm and they come in several different forms: short fibers (known as staple, or chopped), continuous single fibers (filaments or monofilaments), untwisted bundles of continuous filaments (tow), and twisted bundles of continuous filaments (yarn). Nonwoven fabrics can be formed by many processes such as meltblowing, spunbonding, solvent spinning, electrospinning, and carding. The basis weight of nonwoven fabrics is usually expressed in grams per square meter (gsm).

In one embodiment, a disposable dry fibrous substrate comprises non-spherical, abrasive, cleaning particles mechanically anchored to the fibers of the substrate.

The Fibrous Substrate

The fibrous substrate, or web, may comprise synthetic fibers and/or natural fibers. The fibers may be water insoluble. The fibrous substrate may have a basis weight of between 10 and 100 grams per square meter.

Synthetic fibers suitable for use in the substrate of the disclosed wipe may include, but are not limited to, nylons, polyesters, acrylics, olefin fibers such as polyethylene and polypropylene, carbon fibers, glass fibers, metal fibers.

The natural fibers may be cellulose-containing fibers including, but not limited to, cotton fiber, flax fiber, hemp fiber, sisal fiber, jute fiber, kenaf fiber, bamboo fiber, coconut fiber, and wood pulp. Naturally derived fiber suitable for use in this disclosure may include, but are not limited to, rayon, lyocell, and viscose or other materials derived from natural fibers. For example, lyocell may be derived from wood pulp, viscose may be derived from wood or cotton fibers, and rayon may be derived from a wide variety of cellulose-containing natural fibers. The web of fibers may comprise at least 80% of cellulosic fibers. The web of fibers may be a paper substrate.

The web of fibers may be formed by water or air or mechanical entanglement, meltblown, spunbond, thermally or chemically bond. The fibers may comprise carded, staple, wet laid, air laid and/or spunbond fibers. The web of fibers may be made according to a hydro-entangling process.

Processes to prepare the web of fibers comprising paper include wet-laid papermaking processes and air-laid papermaking processes, and embossing and printing processes. Such processes typically comprise the steps of preparing a fiber composition in the form of a suspension in a medium, either wet, more specifically aqueous medium, or dry, more specifically gaseous (i.e., with air as medium). The aqueous medium used for wet-laid processes is oftentimes referred to as a fiber slurry. The fibrous suspension is then used to deposit a plurality of fibers onto a forming wire or papermaking belt such that an embryonic fibrous structure can be formed, after which drying and/or bonding the fibers together results in a fibrous structure. Further processing the fibrous structure can be carried out such that a finished fibrous structure can be formed. For example, in typical papermaking processes, the finished fibrous structure is the fibrous structure that is wound on the reel at the end of papermaking, and can subsequently be converted into a finished product (e.g., a sanitary tissue product). Fibrous structures can be made by methods known in the art, including by the method and apparatus described in U.S. Pat. No. 4,637,859, issued Jan. 20, 1987, to Trokhan.

The article may comprise one or more webs of fibers disposed in face-to-face relationships with each other. The respective webs may be adhesively, thermally or mechanically bonded to each other. The abrasive particle elements may be disposed upon the surfaces of the layers or webs of the article. The particles may be disposed upon the layers in a pattern. The pattern may cover less than 30% of the surface area of the substrate. The pattern may be disposed upon an external surface of a multi-layer substrate, or upon an internal surface of the overall substrate between respective layers of the overall structure.

The Abrasive Particles:

In one embodiment, the shaped particles have a longitudinal length (L) and a predetermined complex cross-sectional shape extending on a plane perpendicular to said longitudinal length (L). The cross-sectional shape has at least one vertex. An edge extends along the length L from the vertex. The particles further comprise an anchoring element disposed away from the edge. The ratio of said length (L) to a perimeter-equivalent diameter of said predetermined cross-sectional shape "ECD $P_{Hull}$" is between about 0.5 and about 5.

The anchoring element comprises the development of a portion of the cross-sectional shape along the length L. The anchoring element may comprise a simple curved hook shape extended along L, or the anchor element may comprise a more complex polygonal, curved, or hybrid, curved and polygonal cross-sectional portion extended along L. Exemplary anchor element cross-sectional shapes include: barbs, catches, hasps, crooks, claws and modifications of letters and numbers including M, S, C, W, 3, and 6. In one embodiment, the anchoring element may be considered to have at least one concavity as described below. The relative dimensions of the particle, the anchoring element, and the fibers of a substrate enable the anchoring elements to capture the substrate fibers and to entangle the particle among the fibers attaching the particles to the substrate.

In one embodiment, the predetermined cross-sectional shape comprises a plurality of vertices wherein edges extend along L from each of the vertices. The shape further comprises a plurality of anchoring elements, each anchoring element disposed away from at least one edge.

In one embodiment, the shaped particles comprise extruded, and/or three-dimensional printed, elements having a longitudinal length (L) extending parallel to a z-axis and a complex cross-sectional shape extending on a plane perpendicular to said longitudinal length (L) and parallel to an x-y plane of the fiber. The complex cross-sectional shape has at least one concave, or hollowed inward, area. The elements have at least one elongate protrusion projecting in a direction parallel to the longitudinal length (L), each protrusion having at least one edge. The complex cross-sectional shape is a predetermined cross-sectional shape. In one embodiment, the abrasive particles may have an appearance which contrasts with that of the substrate. In this embodiment, the user of the article may easily discern the presence of the particles as part of the article.

In one embodiment, the diameter of the largest inscribed disk Dmax-in-disk disposed in the x-y plane into one concavity of the element is at least equal or above the minimum Feret diameter Fmin of the smallest fiber of the dry substrate.

The Dmax-in-disk, and minimum Feret diameter may each be measured using microscopy to obtain images of the fibers and particles together with appropriate measurement tools as are known in the art.

In one embodiment, $D_{max-in-disk}$ is between 1.5 to 20 times the minimum Feret diameter $F_{min}$ of the smallest fiber of the dry substrate. In one embodiment, $D_{max-in-disk}$ is between 2 to 10 times the minimum Feret diameter $F_{min}$ of the smallest fiber of the dry substrate. In one embodiment, $D_{max-in-disk}$ is between 4 to 8 times the minimum Feret diameter $F_{min}$ of the smallest fiber of the dry substrate.

In one embodiment, the minimum Feret diameter $F_{min}$ of the smallest fiber of the disposable dry substrate is between 8 to 100 microns. In one embodiment, the minimum Feret diameter $F_{min}$ of the smallest fiber of the disposable dry substrate is between 10 to 50 microns. In one embodiment, the minimum Feret diameter $F_{min}$ of the smallest fiber of the disposable dry substrate is between 10 to 25 microns.

In one embodiment, $D_{max-in-disk}$ is between 10 and 400 microns. In one embodiment, $D_{max-in-disk}$ is between 20 and 200 microns. In one embodiment, $D_{max-in-disk}$ is between 40 and 160 microns. In one embodiment, $D_{max-in-disk}$ is between 60 and 120 microns. In one embodiment, from 20 to 200 microns. In one embodiment, from 40 to 160 microns. In one embodiment, from 60-120 microns.

In one embodiment, the cross-sectional shape of the elements has a form factor of from 0.05 to 0.5 as measured according to ISO 9276-6. In one embodiment, the cross-sectional shape of said elements has a form factor of from 0.1 to 0.4. In one embodiment, the cross-sectional shape of said elements has a form factor of from 0.1 to 0.3. In one embodiment, the cross-sectional shape of said elements has a form factor of from 0.1 to 0.2.

In one embodiment, the cross-sectional shape of the elements has a solidity of from 0.1 to 0.7.

In one embodiment, the cross-sectional shape of the elements has a solidity of from 0.2 to 0.6.

In one embodiment, the cross-sectional shape of the elements has a solidity of from 0.2 to 0.55.

In one embodiment, the cross-sectional shape of the elements has a solidity of from 0.2 to 0.45.

In one embodiment, the ratio of the length (L) to equivalent circle diameter of said predetermined cross-sectional shape "ECD $P_{Hull}$" is from 0.5 to 5. In one embodiment, the ratio of the length (L) to equivalent circle diameter of said predetermined cross-sectional shape "ECD $P_{Hull}$" is from 0.8 to 4. In one embodiment, the ratio of the length (L) to equivalent circle diameter of said predetermined cross-sectional shape "ECD $P_{Hull}$" is from 1 to 3. In one embodiment, the ratio of the length (L) to equivalent circle diameter of said predetermined cross-sectional shape "ECD $P_{Hull}$" is from 1.5 to 2.5. In one embodiment, the length of the elements (L) is between 50 and 1000 microns. In one embodiment, the length of the elements (L) is between 100 and 500 microns. In one embodiment, the length of the elements (L) is between 200 and 400 microns. In one embodiment, the ECD $P_{Hull}$ is from 40 μm to 800 μm. In one embodiment, the ECD $P_{Hull}$ is from 100 μm to 600 μm. In one embodiment, the ECD $P_{Hull}$ is from 200 µm to 400 µm. In one embodiment, the abrasive particles may have an ECD of between 5% and 100% of the thickness of the fibrous substrate.

In one embodiment, the cross-sectional shape has a maximum Feret diameter $F_{max}$ of between 100 µm and 800 µm. In one embodiment, the cross-sectional shape has a maximum Feret diameter $F_{max}$ of between 200 µm and 500 µm. In one embodiment, the cross-sectional shape has a maximum Feret diameter $F_{max}$ of between 250 µm and 400 µm. In one embodiment, the cross-sectional shape has a maximum Feret diameter $F_{max}$ of between 50 µm and 350 µm.

In one embodiment, the elements may comprise portions of an etruded fiber which has been segmented. The material of the fiber may be organic or inorganic. In one embodiment, the material may comprise a thermoplastic resin.

In one embodiment, the elements comprises from 3 to 30 protrusions. In one embodiment, the elements comprises from 3 to 24 protrusions. In one embodiment, the elements comprises from 3 to 20 protrusions. In one embodiment, the elements comprises from 3 to 15 protrusions. In one embodiment, the elements comprises from 3 to 6 protrusions. The protrusions may be in the form of abrasive wings. The protrusions may comprise at least one edge having an angle defined between the surfaces defining the tip of the edge. In one embodiment, the angle may be between 10 and 90 degrees. In one embodiment, the angle may be between 20 and 80 degrees. In one embodiment, the angle may be between 30 and 60 degrees. In one embodiment, the protrusion may comprise an edge having a tip diameter of between 1 µm and 50 µm. In one embodiment, the protrusion may comprise an edge having a tip diameter of between 2 µm and 25 µm. In one embodiment, the protrusion may comprise an edge having a tip diameter of between 2 µm and 15 µm.

In one embodiment, the abrasive particle elements may be comprised of a material selected from the group consisting of polyethylene, polypropylene, polyvinyl chloride, polycarbonate, melamine, urea, polyurethane, polyacrylate, polystyrene, phenolic polyesters, polyamide, minerals and mixtures thereof. In one embodiment, the abrasive particles comprise a biodegradable material having a biodegradability rate of greater than 50% according to ASTM6400 test method, and selected from the group consisting of polyhydroxy-alkanoates, polyhydroxyButyrate, polyhydroxyButyrate-co-valerate, polyhydroxyButyrate-co-hexanoate and mixtures thereof, poly(lactic acid), polycaprolactone, polyesteramide, aliphatic and/or, aromatic copolyesters containing a mix of succinic, adipic, terepthalic diacids, propanediol, butanediol, pentanediol monomer and mixtures thereof; thermoplastic starch; and mixtures thereof.

In one embodiment, the abrasive particles comprise from 5 to 70%, by weight of particle, of reinforcing filler particles selected from the group consisting of organic materials, in-organic materials and mixtures thereof, wherein the organic material is selected from the group consisting of: nut shell, wood, cotton, flax or bamboo fibers, corn cob, rice hull, sugars, carbohydrates, starch from corn, maize, potato, or urea; other plant parts selected from the group consisting of stems, roots, leaves, seeds; polyesters; biodegradable polyesters selected from the group consisting of polyhydroxy-alkanoates, poly(lactic acid), polycaprolactone, polyesteramide, aliphatic and/or copolyesters, and mixtures thereof; and mixtures thereof; the in-inorganic material being selected from the group consisting of carbonate or sulfate salt, phyllosilicate material and mixtures thereof, talc, kaolinite, vermiculite, mica, muscovite, pyrophillite, bentonite, montmorrillonite, feldspar, and mixtures thereof.

Abrasive particles comprised of relatively hard materials may function better in the article. In one embodiment, the underlying material of the abrasive particles has a Mohs hardness of between 1 and 5. In one embodiment, the underlying material of the abrasive particles has a Mohs hardness of between 2 and 4. In one embodiment, the underlying material of the abrasive particles has a Mohs hardness of between 2.5 and 3. In one embodiment, the underlying material of the abrasive particles has a Shore D® hardness between 40 and 90.

The abrasive particle elements of the invention may be produced by extruding a material, through an extruder nozzle orifice along an extruding axis, and. slicing the extruded thermoplastic material into elements having a predetermined length (L). In one embodiment, the extruder nozzle orifice has a predetermined cross-sectional shape on a plane perpendicular to the extruding axis. The predetermined cross-sectional shape may be the inverse image of the predetermined cross-sectional shape of the extruded elements. In one embodiment, the material comprises a thermoplastic material or curable mineral comprising slurry.

In one embodiment, the temperature at the nozzle is kept at a temperature Tn, wherein Tn=Tm−T, and T is greater than 20° C., Tm being the melting temperature of said thermoplastic material. In one embodiment, T is between 30 and 180 C. In one embodiment, T is between 80 and 150 C. In one embodiment, the articles of the invention may be fabricated by air spraying the particles onto the surface of at least 1 fibrous layer of the substrate and vibrating the substrate. In one embodiment, the articles of the invention may be fabricated by pre-mixing the fibers and the abrasive particulates and optionally vibrating the mixture during the formation of the fibrous layer. In one embodiment, the vibration may occur at a vibration frequency ranging between 20 and 20000 Hz.

Figure 2:
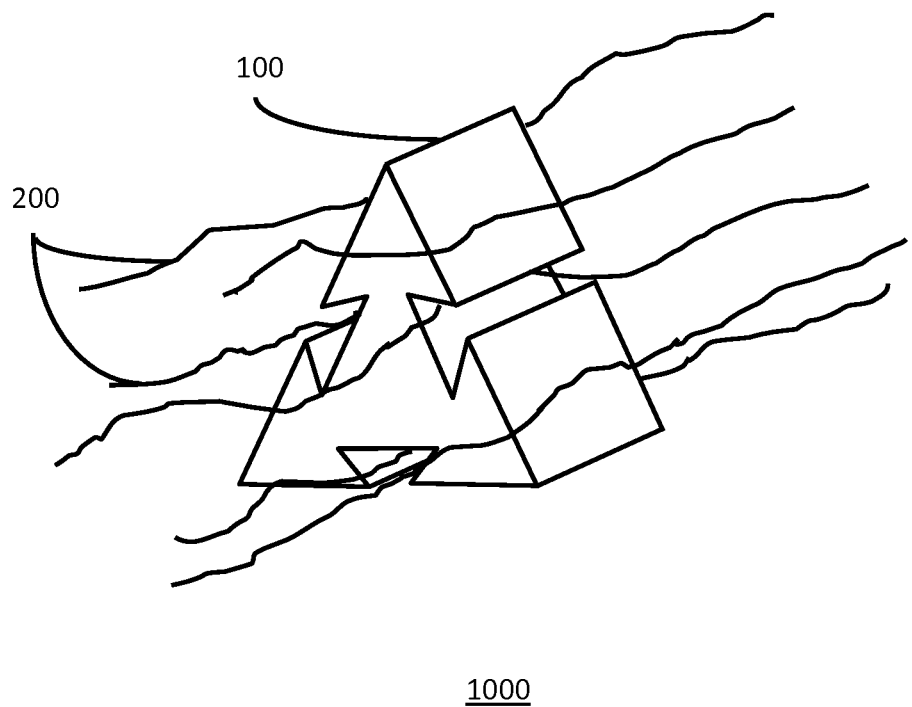
FIG. 2 provides a schematic perspective view of a portion of an article according to one embodiment of the invention.

FIG. 1 provides a cross-sectional illustration of a particle 100 having concave portions 150, according to one embodiment of the invention. FIG. 2 provides a perspective schematic illustration of a combination of a particle 100 and article fibers 200 according to one embodiment of the invention.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. Shaped particles comprising non-spherical abrasive particles, wherein said abrasive particles comprise elements having a longitudinal length (L) and a predetermined complex cross-sectional shape extending on a plane perpendicular to said longitudinal length (L), wherein the cross-sectional shape has at least one vertex, wherein an edge extends along the length L from the vertex, wherein the particles further comprise an anchoring element disposed away from the edge, and the ratio of said length (L) to a perimeter-equivalent diameter of said predetermined cross-sectional shape: "ECD $P_{Hull}$" is between about 0.5 and about 5.

2. The shaped particles according to claim 1 the complex cross-sectional shape comprising at least one concavity, wherein the diameter of the largest inscribed disk $D_{max\text{-}in\text{-}disk}$ traveling in the x-y plane into a concavity of the element is between about 10 and about 800 microns.

3. The shaped particles according to claim 1 where said the cross-sectional shape of said elements has a form factor of between about 0.05 and about 0.5 as measured according to ISO 9276-6.

4. The shaped particles according to claim 1 where the cross-sectional shape of said elements has a solidity of between about 0.1 and about 0.7 according to ISO 9276-6.

5. The shaped particles according to claim 1 where length of the elements (L) is between about 50 and about 1000 microns.

6. The shaped particles according to claim 1 where the ECD $P_{Hull}$ is between about 40 µm and about 800 µm.

7. The shaped particles according to claim 1 wherein said cross-sectional shape has a maximum Feret diameter $F_{max}$ of between about 100 µm and about 800 µm and a minimum Feret diameter $F_{min}$ of between about 50 µm and about 350 µm.

8. The shaped particles according to claim 1 wherein each said edge has a tip diameter of between about 1 µm and about 50 µm.

9. The shaped particles according to claim 1 wherein the particles comprise a material selected from the group consisting of polyethylene, polypropylene, polyvinyl chloride, polycarbonate, melamine, urea, polyurethane, polyacrylate, polystyrene, phenolic polyesters, polyamide, minerals and mixtures thereof.

10. The shaped particles according to claim 1 wherein the particles comprise a biodegradable material having a biodegradability rate of greater than 50% according to ASTM6400 test method, and selected from the group consisting of polyhydroxy-alkanoates, polyhydroxybutyrate, polyhydroxybutyrate-co-valerate, polyhydroxybutyrate-co-hexanoate and mixtures thereof, poly(lactic acid), polycaprolactone, polyesteramide, aliphatic and/or, aromatic copolyesters containing a mix of succinic, adipic, terepthalic diacids, propanediol, butanediol, pentanediol monomer and mixtures thereof; thermoplastic starch; and mixtures thereof.

11. The shaped particles according to claim 1 wherein the particles comprise from 5 to 70%, by weight of particle, of reinforcing filler particles selected from the group consisting of organic materials, in-organic materials and mixtures thereof, wherein the organic material is selected from the group consisting of: nut shell, wood, cotton, flax or bamboo fibers, corn cob, rice hull, sugars, carbohydrates, starch from corn, maize, potato, or urea; other plant parts selected from the group consisting of stems, roots, leaves, seeds; polyesters; biodegradable polyesters selected from the group consisting of polyhydroxy-alkanoates, poly(lactic acid), polycaprolactone, polyesteramide, aliphatic and/or copolyesters, and mixtures thereof; and mixtures thereof; the in-inorganic material being selected from the group consisting of carbonate or sulfate salt, phyllosilicate material and mixtures thereof, talc, kaolinite, vermiculite, mica, muscovite, pyrophillite, bentonite, montmorrillonite, feldspar, and mixtures thereof.

12. The shaped particles according to claim 1 wherein the underlying material of the particles has a Mohs hardness of between about 1 and about 5.

13. The shaped particles according to claim 1 wherein the underlying material of the particles has a shore D hardness between about 40 and about 90.

* * * * *